United States Patent
Branton et al.

(10) Patent No.: US 9,373,003 B2
(45) Date of Patent: Jun. 21, 2016

(54) SYSTEMS AND METHODS FOR AUTOMATICALLY HANDLING MULTIPLE LEVELS OF ENCRYPTION AND DECRYPTION

(71) Applicant: AppSense Limited, Warrington (GB)

(72) Inventors: Paul Keith Branton, Rochdale (GB); Paul Delivett, Runcorn (GB)

(73) Assignee: AppSense Limited, Warrington (GB)

( * ) Notice: Subject to any disclaimer, the term of this patent is extended or adjusted under 35 U.S.C. 154(b) by 95 days.

(21) Appl. No.: 14/317,176

(22) Filed: Jun. 27, 2014

(65) Prior Publication Data

US 2015/0379295 A1    Dec. 31, 2015

(51) Int. Cl.
*G06F 21/62*    (2013.01)
*G06F 21/60*    (2013.01)

(52) U.S. Cl.
CPC .......... *G06F 21/6218* (2013.01); *G06F 21/602* (2013.01)

(58) Field of Classification Search
CPC ... G06F 21/6218; G06F 21/602; G06F 21/62; G06F 2221/2107; H04L 63/0428
See application file for complete search history.

(56) References Cited

U.S. PATENT DOCUMENTS

| | | | |
|---|---|---|---|
| 6,378,071 | B1 | 4/2002 | Sasaki et al. |
| 2003/0200436 | A1 | 10/2003 | Eun et al. |
| 2004/0186861 | A1* | 9/2004 | Phatak .............. G06F 17/30132 |
| 2006/0005255 | A1* | 1/2006 | Lipsky .................... G06F 21/10 726/27 |
| 2006/0143084 | A1* | 6/2006 | Donnelli ................ G06Q 30/02 705/14.49 |
| 2007/0260881 | A1 | 11/2007 | Krasnyanskiy et al. |
| 2008/0307175 | A1 | 12/2008 | Hart et al. |
| 2012/0272061 | A1 | 10/2012 | Molau |
| 2013/0117811 | A1 | 5/2013 | Phillips |

OTHER PUBLICATIONS

UK Search Report mailed on Jan. 23, 2015 for co-pending UK Application No. GB1412800.3; 3 pages.

* cited by examiner

*Primary Examiner* — William Goodchild
(74) *Attorney, Agent, or Firm* — Wilmer Cutler Pickering Hale and Dorr LLP

(57) ABSTRACT

Systems and methods are provided for automatically handling multiple levels of encryption and decryption. An electronic file is received to add to encrypted storage. The electronic file is encrypted to generate a new level of encryption for the electronic file using an encryption process that uses encryption data to generate the new level of encryption and to decrypt the new level of encryption. A set of existing encryption data associated with the electronic file is identified, wherein each existing encryption data from the set of existing encryption data is associated with an existing level of encryption already applied to the electronic file. The encryption data is added to the set of existing encryption data associated with the electronic file so that the existing levels of encryption and the new level of encryption can be decrypted.

17 Claims, 6 Drawing Sheets

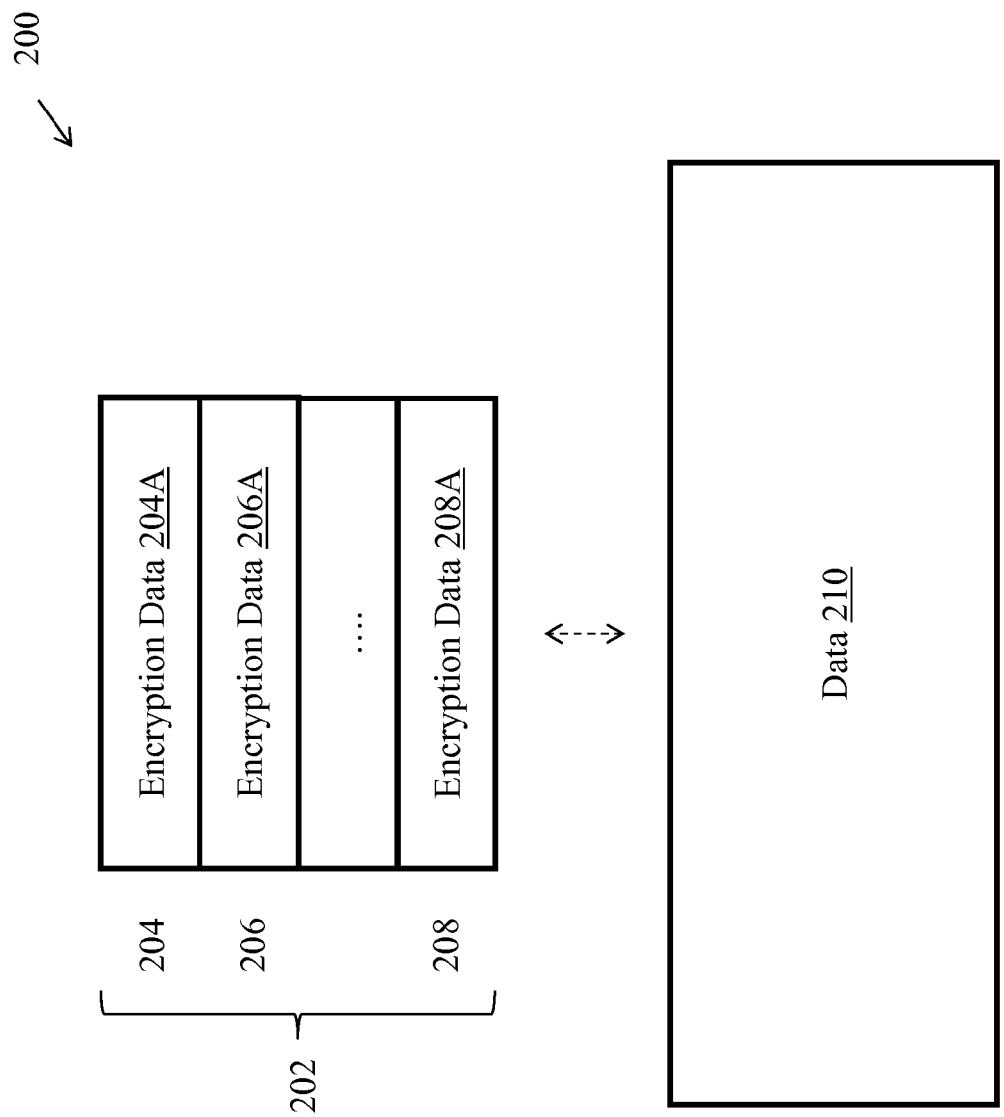

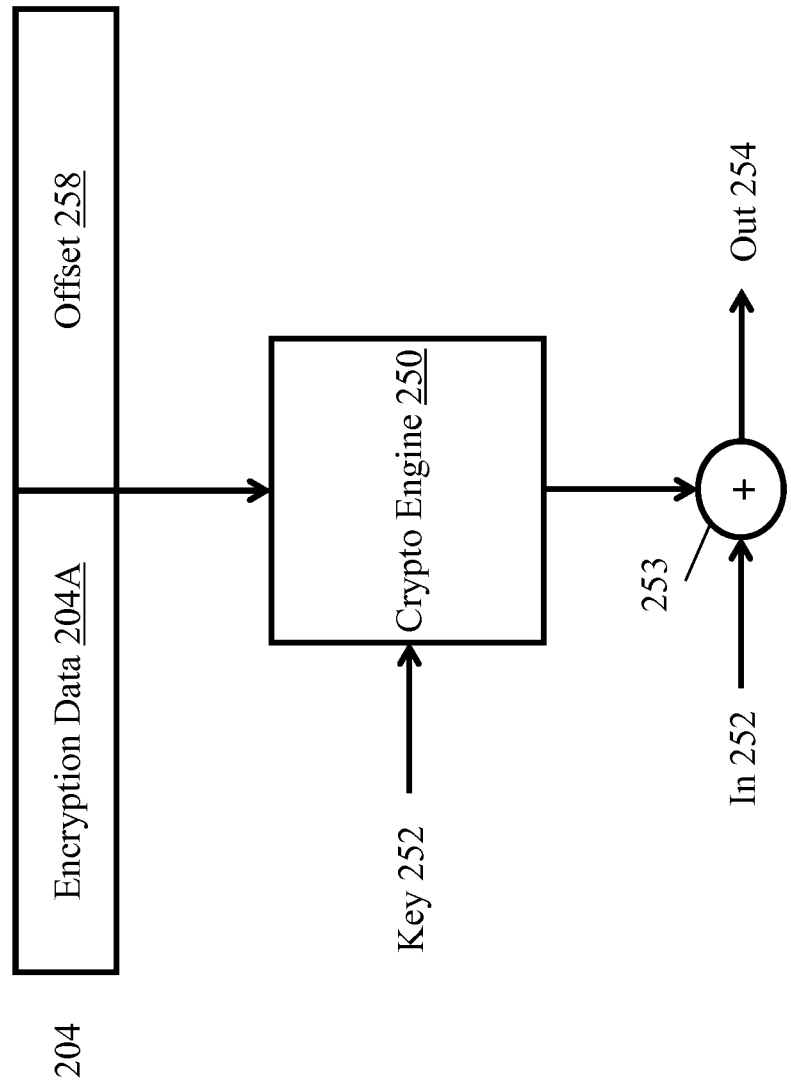

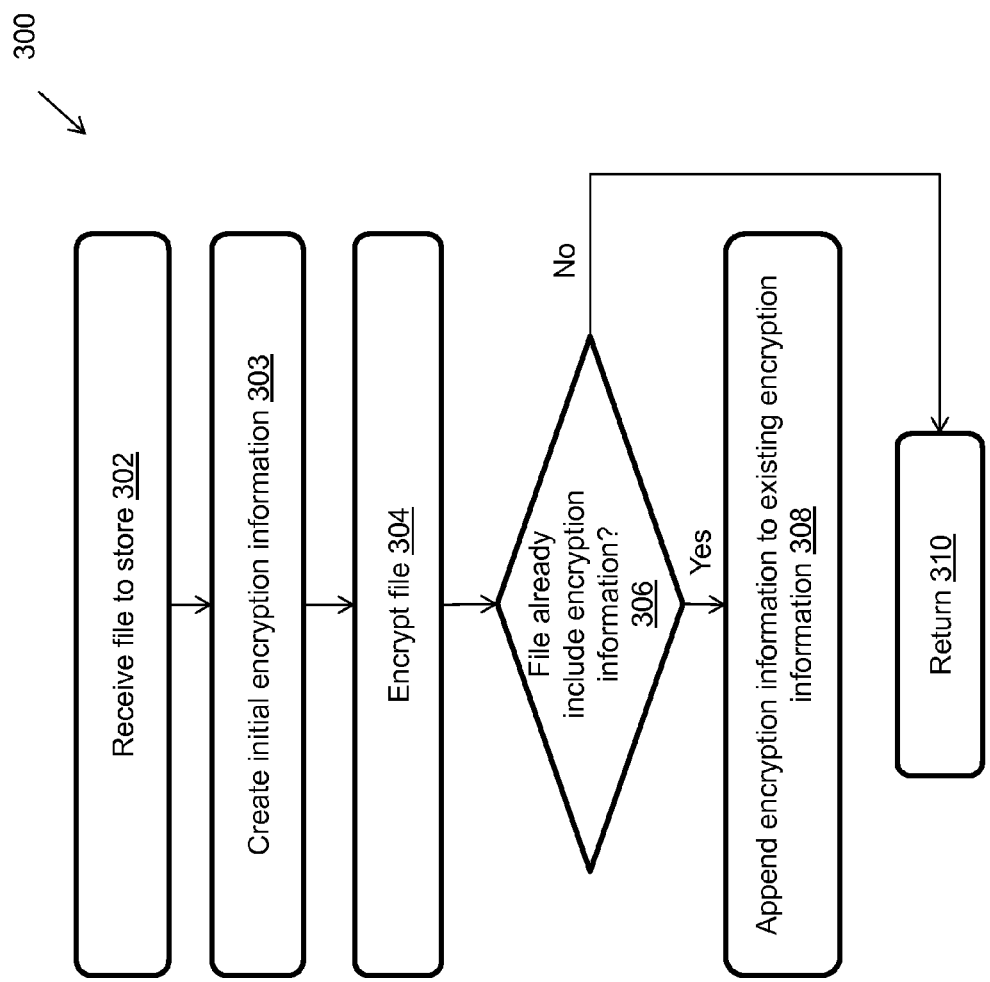

SYSTEMS AND METHODS FOR AUTOMATICALLY HANDLING MULTIPLE LEVELS OF ENCRYPTION AND DECRYPTION

RELATED APPLICATIONS

This application is related to U.S. application Ser. No. 13/946,770, entitled "Systems, Methods and Media for Selective Decryption of Files Containing Sensitive Data," and filed on Jul. 19, 2013, which is incorporated by reference herein in its entirety.

TECHNICAL FIELD

Disclosed systems, methods and media generally relate to automatically handling multiple levels of encryption and decryption.

BACKGROUND

Certain application programs (e.g., backup daemons, file directory management programs, etc.) running on a computing device may need to read from, and write to, both insecure and secure storage areas. Such storage areas may be local or remote to the computing device. This can create complications since some security mechanisms may prevent non-secure applications from accessing files in the secure storage area (e.g., reading from, writing to, moving, etc.).

To deal with this and/or other similar issues, techniques can be used to selectively decrypt files based on the requesting application. For example, encrypted files can be stored in a secure file storage area that monitors access requests to the encrypted files to determine whether to decrypt part or all of a file associated with the access request (e.g., by determining whether the accessing program is authorized to access the associated file). If the secure file storage area determines that the device is authorized to view the encrypted file, the secure file storage area can decrypt the file and return the unencrypted file to the requesting program. However, if the device is not authorized to view the encrypted file, the secure file storage area can return the encrypted version of the file.

However, such secure file storage areas are often configured to encrypt each new write request regardless of whether the underlying file is encrypted (or not). For example, if a secure file storage area returns an encrypted file to a requesting program and the requesting program subsequently copies the encrypted file back to the secure file storage area, the secure file storage area may again encrypt the already-encrypted file, resulting in a file that cannot be decrypted since the secure file storage area is not aware of the initial level of encryption.

SUMMARY

In accordance with the disclosed subject matter, systems, methods, and non-transitory computer-readable media are provided for automatically handling multiple levels of encryption and decryption. Generally, techniques provide for storing encryption information for multiple levels of encryption so that a file can be encrypted multiple times and still be decrypted using the encryption info for each level. The techniques also provide, for example, techniques for removing extra levels of encryption while handling access requests for the file during removal of the extra levels of encryption.

The disclosed subject matter includes a computerized method for handling multiple levels of encryption so that data can be encrypted multiple times and subsequently decrypted to properly unencrypt the data. A computing device receives an electronic file to add to encrypted storage that is in communication with the computing device. The computing device encrypts the electronic file to generate a new level of encryption for the electronic file using an encryption process that uses encryption data to generate the new level of encryption and to decrypt the new level of encryption. The computing device identifies a set of existing encryption data associated with the electronic file, wherein each existing encryption data from the set of existing encryption data is associated with an existing level of encryption already applied to the electronic file. The computing device adds the encryption data to the set of existing encryption data associated with the electronic file so that the existing levels of encryption and the new level of encryption can be decrypted.

The disclosed subject matter further includes a computing device including a database and a processor in communication with the database, and configured to run a module stored in memory that is configured to cause the processor to receive an electronic file to add to encrypted storage that is in communication with the computing device. The module stored in memory is configured to cause the processor to encrypt the electronic file to generate a new level of encryption for the electronic file using an encryption process that uses encryption data to generate the new level of encryption and to decrypt the new level of encryption. The module stored in memory is configured to cause the processor to identify a set of existing encryption data associated with the electronic file, wherein each existing encryption data from the set of existing encryption data is associated with an existing level of encryption already applied to the electronic file. The module stored in memory is configured to cause the processor to add the encryption data to the set of existing encryption data associated with the electronic file so that the existing levels of encryption and the new level of encryption can be decrypted.

The disclosed subject matter further includes a non-transitory computer readable medium. The non-transitory computer readable medium has executable instructions operable to cause an apparatus to receive an electronic file to add to encrypted storage that is in communication with the computing device. The non-transitory computer readable medium has executable instructions operable to cause the apparatus to encrypt the electronic file to generate a new level of encryption for the electronic file using an encryption process that uses encryption data to generate the new level of encryption and to decrypt the new level of encryption. The non-transitory computer readable medium has executable instructions operable to cause the apparatus to identify a set of existing encryption data associated with the electronic file, wherein each existing encryption data from the set of existing encryption data is associated with an existing level of encryption already applied to the electronic file. The non-transitory computer readable medium has executable instructions operable to cause the apparatus to add the encryption data to the set of existing encryption data associated with the electronic file so that the existing levels of encryption and the new level of encryption can be decrypted.

The techniques described herein can allow already encrypted files to be re-encrypted, with no visible difference to the user's experience such that multiple encrypted data is still readable (e.g., by policy allowed applications). Additionally, since only one level of encryption may be necessary, the system can be configured to remove the additional levels of encryption. The system can remove the extra encryption as soon as the encrypted file has completed being written to the encrypted storage. The system can remove the additional encryption in place so that no extra disk space is needed, so that the removal is performed faster (e.g., since the system does not need to copy all the data, remove additional encryption layers, and then re-copy the data back), and/or the like. The system can be configured to handle access requests while decrypting excess levels of encryption. For example, the system can block access requests by trusted applications until the excess layers of encryption are removed from data associated with the request. The system can similarly store the current status of extra level encryption removal so that the file can be moved out and then back in such that the system can resume removing the additional levels of encryption.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 2A is an exemplary diagram of a data structure with information indicative of multiple levels of encryption, according to some embodiments;

FIG. 2B is an exemplary diagram of encryption information from an encryption level being used to encrypt or decrypt a file, according to some embodiments;

FIG. 3 is an exemplary diagram of a computerized method for automatically handling multiple levels of encryption, according to some embodiments;

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

The techniques described herein provide for handling multiple levels of encryption and decryption so that a multiple-encrypted file can still be decrypted to access the underlying data. In some embodiments, encryption data for each level of encryption (e.g., an initialization vector) is associated with the file so that the system can use the encryption data to decrypt each level of encryption (e.g., when trusted applications authorized to view the non-encrypted file request access). In some embodiments, since only one level of encryption is necessary to maintain the integrity of the data, the system can be configured to remove the remaining levels of encryption. The removal of the extra levels of encryption can be done block-by-block so that the process can be interrupted for access requests during the removal process.

Figure 1:
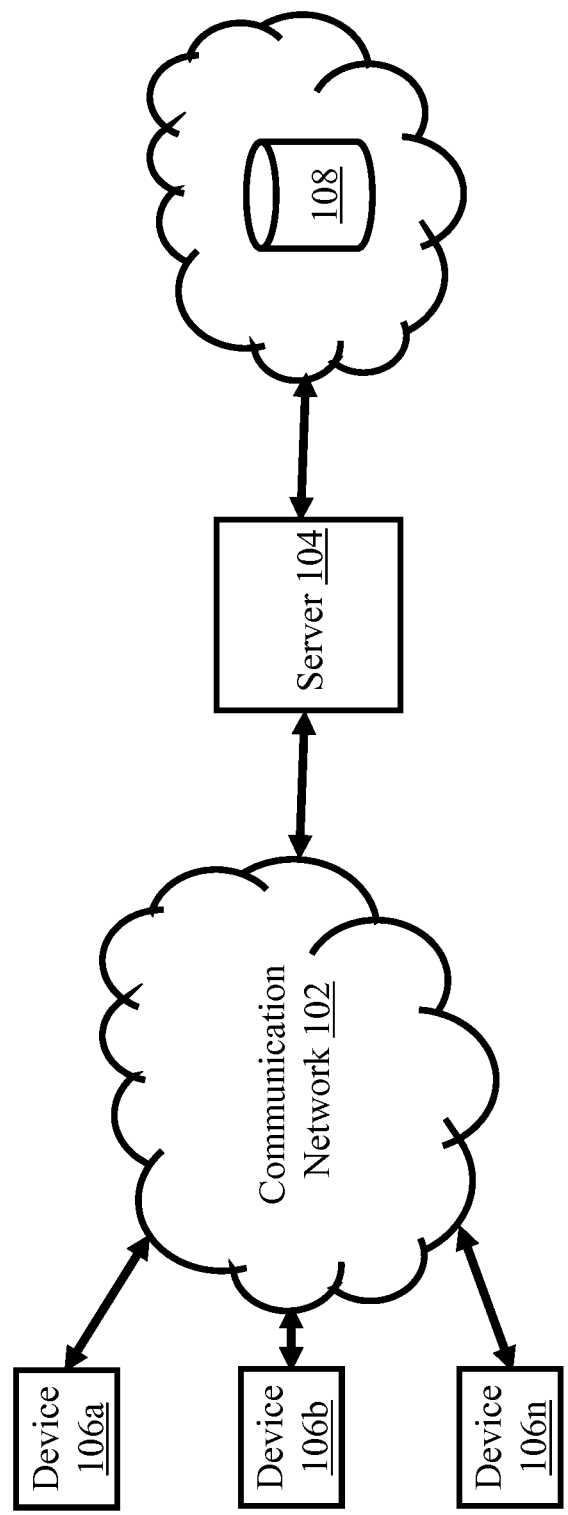
FIG. 1 is an exemplary diagram of a system configured to automatically handle multiple levels of encryption and decryption, according to some embodiments.

FIG. 1 is an exemplary diagram of a system 100 configured to automatically handle multiple levels of encryption and decryption, according to some embodiments. The system 100 includes a communication network 102, a server 104, at least one client device 106 (e.g., client devices 106a, 106b, ... 106n, collectively referred to as client device 106), and a database 108.

Client device 106 is in communication with the server 104 via the network 102. Each client device 106 can send data to, and receive data from, server 104 over communication network 102. Each client device 106 can be directly coupled to server 104; alternatively, each client device 106 can be connected to server 104 via any other suitable device(s), communication network(s), or combination thereof. For example, each client device 106 can be coupled to server 104 via one or more routers, switches, access points, and/or communication networks (as described below in connection with communication network 102).

A client device 106 can include a desktop computer, a mobile computer, a tablet computer, a cellular device, a smartphone or any computing system that is capable of performing computation and runs one or more client software programs. For example, a client device 106 can be a mobile station running a selective decryption module that can interact with files in a secure file storage area. In some embodiments, the secure file storage area is coupled to server 104. Server 104 can be a single server, a network of servers, or a farm of servers in a data center.

Communication network 102 can include a network or combination of networks that can accommodate private data communication. For example, communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows communication network 102 as a single network; however, communication network 102 can include multiple interconnected networks listed above.

Server 104 can be coupled to one or more database systems. Database 108 can include at least one of two types of database: a local database and a remotely located database. Database 108 can include any data supported by one or more of data structures; alternatively, it could include one or more database management system (DBMS) or a distributed database. For example, database 108 may include a data structure, or one or more data tables in a DBMS, for storing information related to one or more secure file storage areas and files contained in the secure file storage areas. Database 108 can also include at least one of a relational database, object database (a.k.a., object-oriented database), XML database, cloud database, active database, and a data warehouse. Database 108 may include at least one physical, non-transitory storage medium.

In some embodiments, database 108 can be provided as an enterprise system in a corporate environment. For example, communication network 102, server 104, client devices 106, and database 108 can be located in a close proximity and can be a part of a single company. In some cases, server 104, client devices 106, and database 108 can be located in the same building and can be coupled to one another via a local communication network. The local communication network can include a local area network (LAN), a corporate network, and a virtual private network (VPN) associated with the corporate network. FIG. 1 shows database 108 as separate from communication network 102. However, database 108 can be a part of communication network 102 or another communication network.

The communication network 106 can include a network or combination of networks that can accommodate public or private data communication. For example, the network 106 can include a local area network (LAN), a cellular network, a telephone network, a computer network, a packet switching network, a line switching network, a wide area network (WAN), any number of networks that can be referred to as an Intranet, and/or the Internet. Such networks may be implemented with any number of hardware and software components, transmission media and network protocols. FIG. 1 shows the network 106 as a single network; however, the network 106 can include multiple interconnected networks listed above.

The processors (e.g., in the device 106 and/or the server 104) can be configured to implement the functionality described herein using computer executable instructions stored in a temporary and/or permanent non-transitory memory. The memory can be flash memory, a magnetic disk drive, an optical drive, a programmable read-only memory (PROM), a read-only memory (ROM), or any other memory or combination of memories. The processor can be a general purpose processor and/or can also be implemented using an application specific integrated circuit (ASIC), programmable logic array (PLA), field programmable gate array (FPGA), and/or any other integrated circuit. Similarly, database 108 may also be flash memory, a magnetic disk drive, an optical drive, a programmable read-only memory (PROM), a read-only memory (ROM), or any other memory or combination of memories. The server 104 can execute an operating system that can be any operating system, including a typical operating system such as Windows, Windows XP, Windows 7, Windows 8, Windows Mobile, Windows Phone, Windows RT, Mac OS X, Linux, VXWorks, Android, Blackberry OS, iOS, Symbian, or other OSs. While not shown, the server 104 can include a processor and/or memory in addition to the database 108.

The components of system 100 can include interfaces (not shown) that can allow the components to communicate with each other and/or other components, such as other devices on one or more networks, server devices on the same or different networks, or user devices either directly or via intermediate networks. The interfaces can be implemented in hardware to send and receive signals from a variety of mediums, such as optical, copper, and wireless, and in a number of different protocols some of which may be non-transient.

The software in the device 106 and/or server 104 can be divided into a series of tasks that perform specific functions. These tasks can communicate with each other as desired to share control and data information throughout the computing device (e.g., via defined Application Programmer Interfaces ("APIs")). A task can be a software process that performs a specific function related to system control or session processing. In some embodiments, three types of tasks can operate within the computing devices: critical tasks, controller tasks, and manager tasks. The critical tasks can control functions that relate to the server's ability to process calls such as server initialization, error detection, and recovery tasks. The controller tasks can mask the distributed nature of the software from the user and perform tasks such as monitoring the state of subordinate manager(s), providing for intra-manager communication within the same subsystem (as described below), and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem can be a software element that either performs a specific task or is a culmination of multiple other tasks. A single subsystem can include critical tasks, controller tasks, and manager tasks. Some of the subsystems that run on the computing device can include a system initiation task subsystem, a high availability task subsystem, a shared configuration task subsystem, and a resource management subsystem.

The system initiation task subsystem can be responsible for starting a set of initial tasks at system startup and providing individual tasks as needed. The high availability task subsystem can work in conjunction with the recovery control task subsystem to maintain the operational state of the computing device by monitoring the various software and hardware components of the computing device. Recovery control task subsystem can be responsible for executing a recovery action for failures that occur in the computing device and receives recovery actions from the high availability task subsystem. Processing tasks can be distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will preferably not be affected by that problem.

A shared configuration task subsystem can provide the computing device with an ability to set, retrieve, and receive notification of server configuration parameter changes and is responsible for storing configuration data for the applications running within the computing device. A resource management subsystem can be responsible for assigning resources (e.g., processor and memory capabilities) to tasks and for monitoring the task's use of the resources.

In some embodiments, the computing device can reside in a data center and form a node in a cloud computing infrastructure. The computing device can also provide services on demand such as Kerberos authentication, HTTP session establishment and other web services, and other services. A module hosting a client can be capable of migrating from one server to another server seamlessly, without causing program faults or system breakdown. A computing device in the cloud can be managed using a management system.

In some embodiments, server 104 can be configured to provide a secure storage area for files and other types of data, which the server 104 can store in database 108. As described further herein, server 104 can be configured to store encryption information for each level of encryption applied to the file. The server 104 can be configured to decrypt duplicative encryption. The server 104 can be configured to handle access requests to secure data during decryption of outer layers of encryption. In some embodiments, the server 104 can be configured to execute techniques to selectively decrypt files, such as described in U.S. patent application Ser. No. 13/946, 770, entitled "Systems, Methods and Media for Selective Decryption of Files Containing Sensitive Data," and filed on Jul. 19, 2013, which is hereby incorporated by reference herein in its entirety. In some embodiments, the client device 106 can be configured to provide a secure storage area (e.g., in a database on the client device, not shown).

FIG. 2A is an exemplary diagram of a data structure 200 with information indicative of multiple levels of encryption, according to some embodiments. For example, the server 104 can store data structures like data structure 200 for each of the protected files to keep track of how many levels of encryption each file has, and to store information necessary to decrypt each level of encryption. The data structure 200 includes a set of encryption data 202 associated with data 210. The encryption data 202 includes encryption levels 204, 206 through 208. Encryption level 204 includes encryption data 204A, encryption level 206 includes encryption data 206A, and encryption level 208 includes encryption data 208A.

Referring to the encryption data 202, the encryption data can be stored remotely from the data 210. For example, extended attributes can be used to store IVs for Mac-based computing devices, or Alternative Data Streams can be used to store IVs for Windows-based computing devices. In some embodiments, the encryption data can be stored in the file, such as part of the file header and/or metadata. In some embodiments, the encryption data is stored in the file data. One of skill of the art can appreciate that the encryption data can be stored in many different manners without departing from the spirit of the techniques disclosed herein.

Referring further to the encryption data 202, in some embodiments the system can perform encryption/decryption using the Advanced Encryption Standard (AES) encryption algorithm. The system can use a key size of 256 bits, which is often referred to as AES-256. In some embodiments, the system can run the AES encryption algorithm in counter (CTR) mode. CTR mode switches from using the usual block cipher of AES to using a stream cipher that generates the next keystream block by encrypting successive values of a counter. CTR mode allows files to be encrypted and decrypted at any point in the file, without having to pre-process the rest of the file to synchronize the crypto stream. While some examples herein are described using AES-256 CTR, one of skill in the art can appreciate that different encryption methods can be used without departing from the spirit of the techniques disclosed herein.

FIG. 2B is an exemplary diagram of encryption information for encryption level 204 being used to encrypt or decrypt a file, according to some embodiments. The crypto engine 250 uses the key 252 and the encryption data 204A to encrypt or decrypt data. If being used for encryption, then the data being transmitted in at 252 is XORed at 253 and output at 254 as encrypted text. For example, if plain data is input at 252, then it is output with one level of encryption at 254. As another example, if already-encrypted data is input at 252, then it is output with an additional level of encryption at 254.

As described above, in some embodiments the encryption/decryption performed in FIG. 2B is AES-256 CTR. For example, the encryption data 204A is an 8 byte Initialization Vector (IV), and the encryption process uses an 8 byte encryption offset 258, divided by the block size being used for AES, to perform the encryption. With a block size of 16, the standard for AES, an offset of 1 means 16 bytes into the file (e.g., 16 bytes/16 byte block size=an offset of 1), an offset of 2 equals 32 bytes (e.g., 32 bytes/16 byte block size=an offset of 2), and so on. CTR mode can encrypt data 252 by XORing it at 253 with the output of the crypto engine 250, with a given key 252, on the 8 byte IV (e.g., encryption data 204A)+the 8 byte encryption offset 258. The IV and the offset can be combined together, for example, using any lossless operation (e.g., concatenation, addition, XOR) to produce the actual unique counter block used by the crypto engine 250.

Referring to XOR operation 253, the use of XOR can allow various levels of encryption operations to be performed in any order to encrypt and subsequently decrypt the data. For example, if the system applies three levels of encryption (e.g., three different IVs) to an offset of one in the file, the system would encrypt the data with three levels of encryption. The system can subsequently decrypt the data by applying the same three levels of encryption (e.g., the same three IVs) in any order since the order does not change the result when using an XOR operation. For example, if IVs one, two and three are applied—in that order—to encrypt a file, then IV two, one and three can be applied—in that order—to properly decrypt the file.

FIG. 3 is an exemplary diagram of a computerized method 300 for automatically handling multiple levels of encryption, according to some embodiments. At step 302, the system receives a file to store in a secure storage area. At step 303, the system creates initial encryption information for the file (e.g., encryption data). At step 304, the system encrypts the file using encryption information associated with the current level of encryption (e.g., the first level of encryption or additional levels of encryption). At step 306, the system checks whether the file already includes encryption information for other levels of encryption. If the file already includes encryption information, then the method 300 proceeds to step 308 and appends the encryption information for the current level of encryption to the existing encryption information. At step 310, if the file does not already include encryption information, then the method returns and is complete.

Referring to steps 302 through 304, system may not yet know whether the file is already encrypted, or whether the file comprises unencrypted data. Regardless of the current state of encryption, the system can encrypt the file using new encryption information for the current encryption. For example, if using AES-256 CTR encryption, the system can use a unique IV to encrypt the data (e.g., as shown in FIG. 2B).

Referring to steps 306-310, the system checks whether the file already includes encryption information for other levels of encryption to determine how to store the current encryption information. For example, if the file already includes encryption information, then the system can store an array of encryption information (e.g., IVs) to enable multiple encryption/decryption operations for the file. When a file is added to the encrypted storage the first time, it has no associated encryption information and therefore it is encrypted as it is written to the storage and updated to include additional data indicative of the encryption information used during the encryption.

In some embodiments, if the system already includes encryption information, step 304 results in a file that is now multiply encrypted with at least two levels of encryption. When the system has finished copying the file into the encrypted storage, the system can copy data associated with the file. The system can inspect the associated data and determine that the file has one or more additional levels of encryption information already applied to the file (e.g., an array with one or more levels of encryption 204, 206 and 208 as shown in FIG. 2A). For example, each time a file is read from the encrypted storage, the levels of encryption are available to the reading process/application. To protect the algorithm, the encryption information (e.g., encryption data, offsets, and/or the like) can be encrypted using public/private key encryption. Therefore, the system can add the new encryption information just used (e.g., a new IV) is added to the existing encryption information.

If an allowed application reads from the encrypted storage, then the system can perform a decryption cycle to decrypt the data for viewing by the application. The system can determine whether the application is authorized by maintaining a list of authorized applications or devices, authenticating the application or device, and/or by performing any other process known to one of skill in the art.

Figure 4:
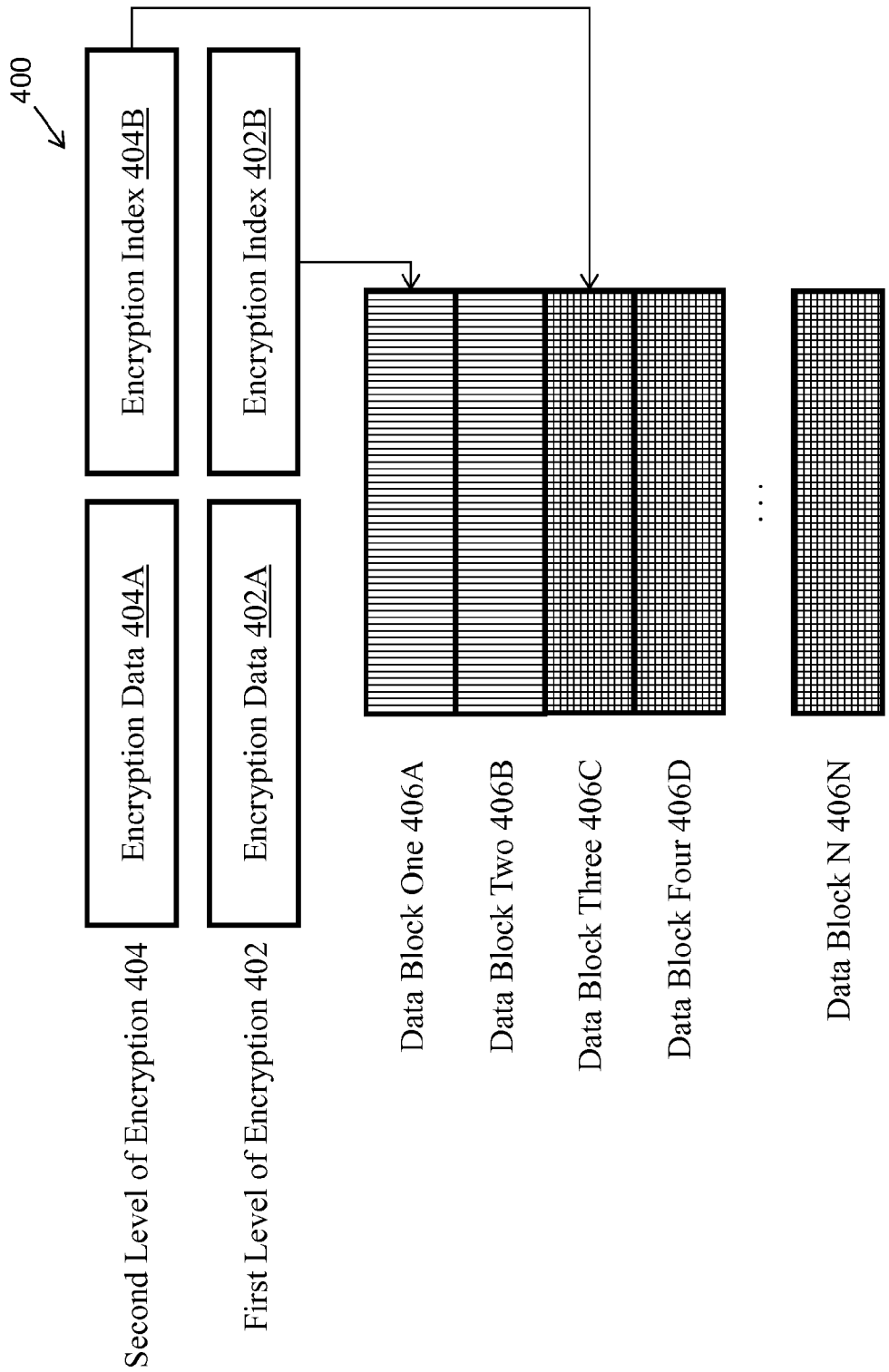
FIG. 4 is an exemplary diagram of decrypting a level of encryption of a data structure with multiple levels of encryption, according to some embodiments.

FIG. 4 is an exemplary diagram of decrypting a level of encryption of a data structure with multiple levels of encryption, according to some embodiments. FIG. 4 shows a data structure 400 (e.g., a file) with a first level of encryption 402 and a second level of encryption 404. The first level of encryption 402 includes encryption data 402A and encryption index 402B. The second level of encryption 404 includes encryption data 404A and encryption index 404B. The data structure 400 includes data blocks 406A, 406B, 406C, 406D through 406N.

The encryption index can be used to keep track of which data blocks are decrypted for each associated initialization vector. Referring to FIG. 4, the system has not started decrypting the first level of encryption, so the encryption index 402B points to the first data block one 406A. The system has decrypted the second level of encryption 404 for data block one 406A and data block two 406B, so the encryption index 404B points to the following data block three 406C. In some embodiments, the system may not include an encryption index for the first level of encryption 402, and/or the system may not use the encryption index for the first level of encryption 402 (e.g., since it is not removed in-place as described further below, so there is no need to keep track of the decryption process of the first level of encryption 402).

In some embodiments, when a file is moved out of the encrypted storage without being decrypted and then back into the encrypted storage, the system automatically encrypts the file with another level of encryption, and the system adds associated encryption information to the file for later use when decrypting the file. Multiple levels of encryption can continue to build up as files are removed and added to the system. The system can be configured to decrypt unnecessary levels of encryption, since only one level of encryption may be necessary to protect the contents of the file.

Figure 5:
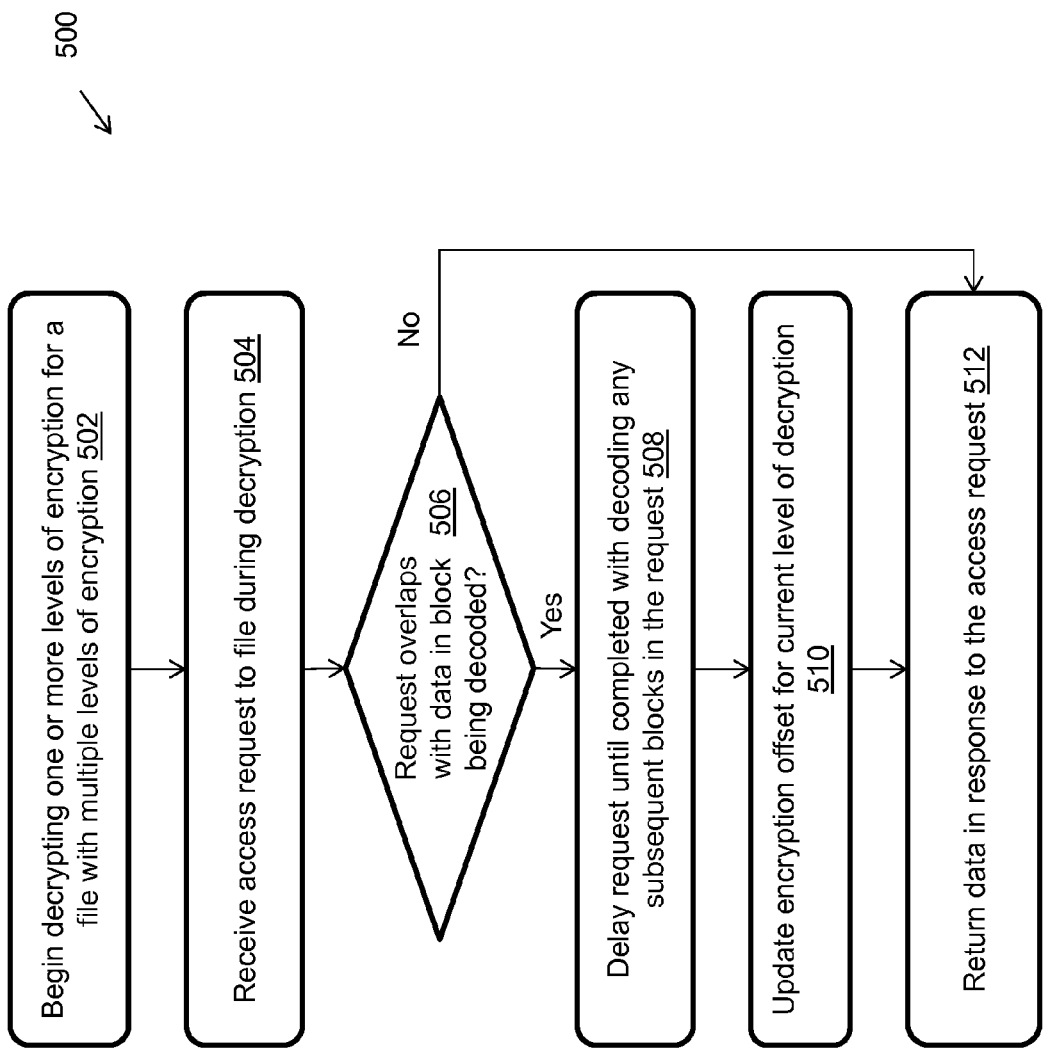
FIG. 5 is an exemplary diagram of a computerized method for automatically handling multiple levels of decryption, according to some embodiments.

FIG. 5 is an exemplary diagram of a computerized method 500 for automatically handling multiple levels of decryption, according to some embodiments. At step 502, the system begins decrypting one or more levels of encryption of a file with multiple levels of encryption. At step 504, the system receives an access request from a program for the file while the system is decrypting the level of encryption for the file. At step 506, the system determines whether the data associated with the request overlaps with the portion of the file being decoded. If the data associated with the request overlaps with the portion of the file being decoded, the method 500 moves to step 508 and delays the access request until the system is finished decoding any subsequent blocks associated with the access request. At step 510, the system updates the encryption index for the current level of decryption to mark where the decryption process needs to resume for the particular level of encryption. If the data associated with the request does not overlap with the portion of the file being decoded, the method 500 proceeds to step 512 and the system returns the requested data in response to the access request (e.g., fully decrypted, or with only partial decryption of the excess levels of encryption).

As described above, the encrypted file can include a set (e.g., a list, an array, etc.) of encryption data (e.g., IVs) that are stored with the file. The encrypted file can also include a block index field (e.g., the encryption index) that indicates which blocks have been decrypted (or not). As described further below, the block index can be used to indicate the status of decrypting the outer level(s) of encryption. For example, blocks prior to the index now only have one level of encryption applied (e.g., a single IV), blocks matching the index are currently being processed, and all levels of encryption are still applied to blocks subsequent to the index. Referring to FIG. 4, the offset 404B is used to keep track of which blocks the system has already decrypted to remove the second level of encryption 404. As described further below, by maintaining block-by-block decryption status information, access requests (e.g., reads) by trusted/authorized applications can be stalled until the system processes blocks associated with the access requests. Since the encryption/decryption block size can be set to a small value (e.g., 16K bytes), the system can be configured to avoid long stalls.

At step 502, the system begins decrypting one or more levels of encryption of a file with multiple levels of encryption. For example, the decryption process can start with the first block of the file (e.g., data block one 406A as shown in FIG. 4) and the system can determine, using the decryption information associated with the file (e.g., encryption data 202 in FIG. 2A, including encryption levels 204, 206 through 208), which encryption data needs to be used to decrypt the outer levels of encryption. To maintain the security of the file, the system can be configured to leave at least one level of encryption applied to the file to protect the contents of the file. For example, the system can be configured to never use the encryption information at position zero of an array storing the encryption information.

In some embodiments, the decryption process is a background task that monitors the encrypted storage to determine when a file finishes being copied into the storage (e.g., and been encrypted while being copied into the encrypted storage). Upon completion of the copy, the system can inspect the file to determine whether the file was multiple-encrypted by checking the encryption information associated with the file. For example, if the system identifies encryption information for multiple levels of encryption in the encryption data associated with the file, the system can begin removing outer levels of encryption.

In some embodiments, the system can be configured to remove additional encryption layers in-place where the file is stored (e.g., without copying the file to a second location to perform decryption). The system can execute the decryption process in the background to allow access while the system removes unnecessary layers of encryption. For example, when the system reaches a new block, the system can read in the data block, apply the encryption data for each encryption level to produce de-double encrypted data, and then write the block back out to the file.

Referring to steps 504-508, the system can be configured to allow access requests while decrypting the file. If the system receives an access request, the system can determine whether to allow immediate access based on the progress of the decryption for the additional levels of encryption. For example, if the access request overlaps with the data block being decrypted, the system can stall the access request while processing the current data block and/or any subsequent blocks in the access request. Referring to FIG. 4, for example, assume that the system is removing the additional layers of encryption, in this example just the second level of encryption 404, from data block three 406C. The system can lock access to data block three 406C. If a trusted application (e.g., an application authorized to read the file being decrypted) requests to read a data range that includes data block two 406B, data block three 406C and data block four 406D, the system can stall the read request until after the system decrypts the second level of encryption 404 from data block three 406C and data block four 406D (e.g., since both blocks are in the read request).

Referring to step 510, each time the extra levels of encryption are removed from a block, the file metadata can be updated to reflect the index to the next block that needs to have additional layers of encryption removed. Referring also to step 512, the system can remove the lock on the block that it just processed, allowing the block of data to be accessed as requested by other trusted applications. Once the system completes decrypting a level of encryption, the system can remove the encryption data and associated offset from the encryption information associated with the file.

If the system does not receive any access requests while processing a particular block, the system can continue processing each subsequent block until the additional layers of encryption are removed. Once completed removing the outermost levels of encryption, the resulting file still has one level of encryption, and therefore the system can avoid storing decrypted data in the encrypted storage.

Referring further to step 512, if the data associated with the request does not overlap with the portion of the file being decoded, the system can process the request after the current block processing is completed. For example, referring to FIG. 4, if a trusted program requests to read just data block one 406A and 406B, the system can allow the trusted program to read of both blocks because the additional levels of decryption have already been removed. If the request is by a trusted application, the system can further decrypt the data associated with the request to also remove the first level of encryption 402. If the request to access the file is not by a trusted application, the system can return the file at whichever point it has been decrypted (e.g., if only partially through removing outer levels of encryption, the file can be returned in the current state of partial decryption).

In some embodiments, removal of the extra level(s) of encryption can be interrupted and restarted. For example, a file that is half de-double encrypted (e.g., as shown in FIG. 4, where data blocks 406A and 406B only have one level of encryption but the remaining blocks are still multiple-encrypted) can be moved out of encrypted storage and moved back in without jeopardizing the contents of the file. Since the system can keep track of the decryption process (e.g., via the encryption indices), the system can handle an additional level of encryption because the new level of encryption will include its own associated offset and therefore the system can independently handle the addition of subsequent levels of encryption, even when the decryption process is interrupted midway through.

In some embodiments, if a file that only has part of the outer levels of decryption is removed and later added back into the system, the system can be configured to handle any increases in file size. For example, data appended to the end of an already encrypted file will have the current valid set of encryption data (e.g., IVs) used to encrypt it. If the system is halfway through removing extra levels of encryption from a file when the new data is added (e.g., the file is read out of the system halfway through the de-encryption process) then new data can be added to the end of the file beyond the current decryption indices. The new data can be written and encrypted using the full set of encryption data so that when the system completes the decryption process it can decrypt the new data as well (otherwise if the new data was added as un-encrypted data, the system would end up encrypting un-encrypted data since the system does not know the new data was added). In some embodiments, rather than encrypting the new data, additional metadata can be stored with the encryption data and index. For example, the system can be configured to store an additional value for each encryption level representative of the maximum block number in the file that needs to be decrypted (e.g., to stop the decryption from continuing too far into the new data). The maximum block number can be stored alongside the block index.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computerized method for handling multiple levels of encryption so that data can be encrypted multiple times and subsequently decrypted to properly unencrypt the data, the method comprising:
    receiving, by a computing device, an electronic file to add to encrypted storage that is in communication with the computing device;
    encrypting, by the computing device, the electronic file to generate a new level of encryption for the electronic file using an encryption process that uses encryption data to generate the new level of encryption and to decrypt the new level of encryption;
    identifying, by the computing device, a set of existing encryption data associated with the electronic file, wherein each existing encryption data from the set of existing encryption data is associated with an existing level of encryption already applied to the electronic file;
    adding, by the computing device, the encryption data to the set of existing encryption data associated with the electronic file so that the existing levels of encryption and the new level of encryption can be decrypted;
    identifying, by the computing device, a total number of levels of encryption among the existing levels of encryption and the new level of encryption; and
    decrypting, by the computing device, all but one of the total number of levels of encryption from the electronic file.

2. The method of claim 1, further comprising storing, for each of the existing levels of encryption and the new level of encryption, an index to keep track of how many blocks of the electronic file have been decrypted for the associated level of encryption.

3. The method of claim 2, further comprising:
    selecting a level of encryption from the existing levels of encryption and the new level of encryption to decrypt from the electronic file;
    decrypting a data block of the electronic file pointed to by the index associated with the selected level of encryption using selected encryption data associated with the selected level of encryption;
    updating the index by one to reflect that the data block is no longer encrypted for the selected level of encryption; and
    associating the updated index with the electronic file.

4. The method of claim 1, further comprising removing encryption information for each of the decrypted levels of encryption from the set of decryption information associated with the electronic file.

5. The method of claim 1, further comprising:
    receiving an access request by a computer program authorized to access the electronic file, the access request being associated with a set of blocks of the electronic file;
    determining that none of the set of blocks are locked by a decryption process that is removing one or more levels of encryption of the block; and
    allowing the access request.

6. The method of claim 1, further comprising:
    receiving an access request by a computer program authorized to access the electronic file, the access request being associated with a set of blocks of the electronic file;
    determining a block from the set of blocks is locked by a decryption process that is removing one or more levels of encryption of the block; and
    blocking the access request until all blocks in the set of blocks are decrypted to remove the one or more levels of encryption.

7. A computing device comprising:
    a database; and
    a processor in communication with the database, and configured to run a module stored in memory that is configured to cause the processor to:
        receive an electronic file to add to encrypted storage that is in communication with the computing device;
        encrypt the electronic file to generate a new level of encryption for the electronic file using an encryption process that uses encryption data to generate the new level of encryption and to decrypt the new level of encryption;
        identify a set of existing encryption data associated with the electronic file, wherein each existing encryption data from the set of existing encryption data is associated with an existing level of encryption already applied to the electronic file;
        add the encryption data to the set of existing encryption data associated with the electronic file so that the existing levels of encryption and the new level of encryption can be decrypted;

identify a total number of levels of encryption among the existing levels of encryption and the new level of encryption; and decrypt all but one of the total number of levels of encryption from the electronic file.

8. The computing device of claim 7, wherein the module stored in memory is further configured to cause the processor to store, for each of the existing levels of encryption and the new level of encryption, an index to keep track of how many blocks of the electronic file have been decrypted for the associated level of encryption.

9. The computing device of claim 7, wherein the module stored in memory is further configured to cause the processor to:

select a level of encryption from the existing levels of encryption and the new level of encryption to decrypt from the electronic file;

decrypt a data block of the electronic file pointed to by the index associated with the selected level of encryption using selected encryption data associated with the selected level of encryption;

update the index by one to reflect that the data block is no longer encrypted for the selected level of encryption; and associating the updated index with the electronic file.

10. The computing device of claim 7, wherein the module stored in memory is further configured to cause the processor to remove encryption information for each of the decrypted levels of encryption from the set of decryption information associated with the electronic file.

11. The computing device of claim 7, wherein the module stored in memory is further configured to cause the processor to:

receive an access request by a computer program authorized to access the electronic file, the access request being associated with a set of blocks of the electronic file;

determine that none of the set of blocks are locked by a decryption process that is removing one or more levels of encryption of the block; and allow the access request.

12. The computing device of claim 7, wherein the module stored in memory is further configured to cause the processor to:

receive an access request by a computer program authorized to access the electronic file, the access request being associated with a set of blocks of the electronic file;

determine a block from the set of blocks is locked by a decryption process that is removing one or more levels of encryption of the block; and block the access request until all blocks in the set of blocks are decrypted to remove the one or more levels of encryption.

13. A non-transitory computer readable medium having executable instructions operable to cause an apparatus to:

receive an electronic file to add to encrypted storage that is in communication with the computing device;

encrypt the electronic file to generate a new level of encryption for the electronic file using an encryption process that uses encryption data to generate the new level of encryption and to decrypt the new level of encryption;

identify a set of existing encryption data associated with the electronic file, wherein each existing encryption data from the set of existing encryption data is associated with an existing level of encryption already applied to the electronic file;

add the encryption data to the set of existing encryption data associated with the electronic file so that the existing levels of encryption and the new level of encryption can be decrypted;

identify a total number of levels of encryption among the existing levels of encryption and the new level of encryption; and decrypt all but one of the total number of levels of encryption from the electronic file.

14. The non-transitory computer readable medium of claim 13, having executable instructions operable to cause the apparatus to store, for each of the existing levels of encryption and the new level of encryption, an index to keep track of how many blocks of the electronic file have been decrypted for the associated level of encryption.

15. The non-transitory computer readable medium of claim 13, having executable instructions operable to cause the apparatus to:

select a level of encryption from the existing levels of encryption and the new level of encryption to decrypt from the electronic file;

decrypt a data block of the electronic file pointed to by the index associated with the selected level of encryption using selected encryption data associated with the selected level of encryption;

update the index by one to reflect that the data block is no longer encrypted for the selected level of encryption; and associating the updated index with the electronic file.

16. The non-transitory computer readable medium of claim 13, having executable instructions operable to cause the apparatus to:

receive an access request by a computer program authorized to access the electronic file, the access request being associated with a set of blocks of the electronic file;

determine that none of the set of blocks are locked by a decryption process that is removing one or more levels of encryption of the block; and allow the access request.

17. The non-transitory computer readable medium of claim 13, having executable instructions operable to cause the apparatus to:

receive an access request by a computer program authorized to access the electronic file, the access request being associated with a set of blocks of the electronic file;

determine a block from the set of blocks is locked by a decryption process that is removing one or more levels of encryption of the block; and block the access request until all blocks in the set of blocks are decrypted to remove the one or more levels of encryption.

* * * * *